United States Patent
Kelly

(10) Patent No.: US 10,237,201 B2
(45) Date of Patent: Mar. 19, 2019

(54) QUALITY OF SERVICE (QOS) BASED DEVICE FOR ALLOCATING COMPUTE WORKLOADS TO HOSTS PROVIDING STORAGE AND NETWORK SERVICES IN SOFTWARE-BASED DATA CENTER

(71) Applicant: DELL PRODUCTS, L.P., Round Rock, TX (US)

(72) Inventor: John Kelly, Dooradoyle (IE)

(73) Assignee: Dell Products, L.P., Round Rock, TX (US)

( * ) Notice: Subject to any disclaimer, the term of this patent is extended or adjusted under 35 U.S.C. 154(b) by 299 days.

(21) Appl. No.: 15/168,138

(22) Filed: May 30, 2016

(65) Prior Publication Data
US 2017/0346760 A1   Nov. 30, 2017

(51) Int. Cl.
*H04L 12/927* (2013.01)
*H04L 29/08* (2006.01)

(52) U.S. Cl.
CPC ........ *H04L 47/805* (2013.01); *H04L 67/1097* (2013.01)

(58) Field of Classification Search
CPC ........ H04L 47/00–47/808; H04L 67/00–67/42
See application file for complete search history.

(56) References Cited

U.S. PATENT DOCUMENTS

| | | |
|---|---|---|
| 8,601,473 B1 | 12/2013 | Aron et al. |
| 8,837,288 B2 | 9/2014 | Hamdi et al. |
| 9,094,307 B1 * | 7/2015 | Edsall .................. H04L 43/028 |
| 9,116,181 B2 * | 8/2015 | Yu .......................... G01R 21/00 |
| 9,191,330 B2 | 11/2015 | Clark et al. |
| 9,239,786 B2 | 1/2016 | Ki et al. |
| 9,275,172 B2 | 3/2016 | Ostermeyer et al. |
| 2006/0074948 A1 * | 4/2006 | Motoki .............. G06F 11/3409 |

(Continued)

FOREIGN PATENT DOCUMENTS

CN   104301430 B   1/2015

OTHER PUBLICATIONS

Govil et al., "Cellular Disco: resource management using virtual clusters on shared-memory multiprocessors", Dec. 1999, Operating Systems Reviews, pp. 154-169 (Year: 1999).*

(Continued)

*Primary Examiner* — Clayton R Williams
(74) *Attorney, Agent, or Firm* — Isidore PLLC

(57) ABSTRACT

An Information Handling System (IHS) includes a processor device in communication with a network interface and a memory containing a queue of one or more virtual machine (VM) workloads. The processor device determines, based on monitored resource utilization, a constraining resource of a selected server that is performing one of storage services and network services and assigns a Quality of Service (QoS) threshold to the selected server based on the constraining resource. The processor device assigns VM workload/s, from among compute workloads, to a VM of the IHS based on requirements of the VM for resource utilization. In response to determining that the selected server has failed to satisfy the QoS threshold the predefined number of times over the monitoring interval, the processor device migrates at least one of the assigned VM workloads away from the selected server to another server of the IHS.

12 Claims, 7 Drawing Sheets

(56) References Cited

U.S. PATENT DOCUMENTS

| | | | | |
|---|---|---|---|---|
| 2009/0235265 | A1* | 9/2009 | Dawson | G06F 9/5077 718/104 |
| 2012/0163174 | A1 | 6/2012 | Shukla et al. | |
| 2013/0195113 | A1 | 8/2013 | Kotha et al. | |
| 2014/0026133 | A1* | 1/2014 | Parker | G06F 9/5083 718/1 |
| 2014/0040474 | A1* | 2/2014 | Blagodurov | G06F 9/5088 709/226 |
| 2014/0052836 | A1 | 2/2014 | Nguyen et al. | |
| 2014/0126424 | A1 | 5/2014 | Nguyen et al. | |
| 2014/0351809 | A1 | 11/2014 | Chawla et al. | |
| 2015/0071123 | A1 | 3/2015 | Sabaa | |
| 2015/0180703 | A1* | 6/2015 | Callister | H04L 41/0627 714/47.2 |
| 2015/0215914 | A1 | 7/2015 | Cho et al. | |
| 2015/0236926 | A1* | 8/2015 | Wright | H04L 41/5022 709/224 |
| 2015/0288590 | A1* | 10/2015 | Mason | H04L 67/1027 709/224 |
| 2015/0304158 | A1 | 10/2015 | Dharmadhikari et al. | |
| 2016/0308734 | A1* | 10/2016 | Feller | H04L 41/5009 |
| 2016/0323098 | A1* | 11/2016 | Bathen | H04L 9/008 |

OTHER PUBLICATIONS

Burt, Jeffrey, "Avaya, H3C, 6Wind Join OpenDaylight SDN Effort" eweek.com, http://www.eweek.com/blogs/first-read/avaya-h3c-6wind-join-opendaylight, pp. 1-6, May 2, 2014, downloaded from the Internet Mar. 5, 2016.

Burt, Jeffrey, "Startup CloudGenix Aims to Bring SDN to WAN", Eweek.com, http://www.eweek.com/networking/startup-cloudgenix-aims-to-bring-sdn, pp. 1-7, May 1, 2015, downloaded from the Internet Mar. 5, 2016.

Cherian, Ben, "What Is the Software Defined Data Center and Why Is It Important?", http://allthingsd.com/20130613/what-is-the-software-defined-data-center-and-why-is-it-important?, Allthingsd.com, Jun. 13, 2013, downloaded from the Internet Mar. 5, 2016.

Davidson, Emily A., "The Software-Defined-Data-Center (SDDC): Concept or Reality? [VMware]" Softchoice Blogs, http://blogs.softchoice.com/advisor/ssn/the-software-defined-data-center, pp. 1-11, Dec. 10, 2012, downloaded from the Internet Mar. 5, 2016.

Herrod, Steve, "Interop and the Software-Defined Datacenter", VMware, Office of the CTO Blog, http://cto.vmware.com/interop-and-the-software-defined-datacenter, pp. 1-3, May 8, 2012, downloaded from the Internet Mar. 5, 2016.

Kovar, Joseph F., "Software-Defined Data Centers: Should You Jump on the Bandwagon?", www.crn.com/news/data-center/240154576/software-defined-data-, May 13, 2013, downloaded from the Internet Mar. 5, 2016.

Lowe, Scott D., "Discover the True Meaning of Software Defined", Enterprise Storage Guide, http://www.enterprisestorageguide.com/discover-true-meaning-software-defined, Jun. 2, 2014, downloaded from the Internet Mar. 3, 2016.

Manca, Pete, "Software-Defined Data Centers: What's the Buzz All About?" Wired.com, http://www.wired.com/insights/2013/05/software-defined-data-centers/ pp. 1-11, May 2013, downloaded from the Internet Mar. 5, 2016.

Research and Markets, "Software Defined Data Center (SDDC) Market—Global Forecast to 2020 for the $77 Billion Market", http://www.prnewswire.com/news-releases/software-defined, pp. 1-3, May 26, 2015, downloaded from the internet Mar. 5, 2016.

Venkatraman, Archana, "Software-defined datacenters demystified", ComputerWeekly.com, www.computerweekly.com/feature/Software-defined-datacentres- pp. 1-5, Nov. 2012, downloaded from the Internet Mar. 5, 2016.

whatis.com, What is Software-Defined Data Center (SDDC)?, http://searchsdn.techtarget.com/definition/software-defined-data-center, Mar. 2013, downloaded from the Internet Mar. 5, 2016.

Wikipedia, "Software Defined Storage", https://en.widipedia.org/wiki/Software-defined-storage, pp. 1-4, downloaded from the Internet Mar. 5, 2016.

* cited by examiner

QUALITY OF SERVICE (QOS) BASED DEVICE FOR ALLOCATING COMPUTE WORKLOADS TO HOSTS PROVIDING STORAGE AND NETWORK SERVICES IN SOFTWARE-BASED DATA CENTER

BACKGROUND

1. Technical Field

The present disclosure relates in general to virtualization of resources of an information handling system (IHS), and more particularly to a software defined data center having management of network storage devices and network computing devices.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Software defined servers, more commonly called virtual machines (VMs), allow workloads to run on software-based constructs that sit atop a virtualization/abstraction layer. Administrators can largely interact with this abstraction layer by using handling tools provided as part of or supporting a hypervisor. More recently, efforts have attempted to extend abstracting or virtualizing to an entire software defined data center (SDDC). SDDC is an approach where all infrastructure is abstracted in some way from the underlying hardware, generally through virtualization. The infrastructure is pooled, and the services that operate in the environment are completely managed in software.

Software-defined storage (SDS) is an evolving concept for computer data storage software to manage policy-based provisioning and management of data storage independent of the underlying hardware. Software-defined storage definitions typically include a form of storage virtualization to separate the storage hardware from the software that manages the storage infrastructure. The software enabling a software-defined storage environment may also provide policy management for feature options such as deduplication, replication, thin provisioning, snapshots and backup.

Software-defined networking (SDN) has recently become popular in virtual, cloud and software-defined environments and the two most important examples of this SDN technology are VMware NSX (from a product perspective) and OpenFlow (from a protocol perspective). These examples take similar approach to the implementation of SDN, with NSX providing the capability to enable any network topology in software (i.e. independently of the underlying network hardware) while OpenFlow separates the control plane from the forwarding plane in an SDN, thus allowing sophisticated traffic management using a common protocol and switches from different vendors. However in the case of both NSX and OpenFlow, the aim of the technology is to increase the ease with which a network environment can be managed, provisioned, and deployed, while assuming that the network devices function only as network devices.

BRIEF SUMMARY

In accordance with the teachings of the present disclosure, a method is provided for managing software-based virtual resources of an Information Handling System (IHS). In one or more embodiments, the method includes determining, by a controller, based on a monitored resource utilization, a constraining resource of a selected server that is performing one of storage services and network services from among the one or more physical servers of the IHS. The constraining resource is a resource from among available resources, including but not limited to (i) processor capacity, (ii) memory capacity, (iii) network bandwidth, and (iv) storage input/output latency. The method includes assigning a Quality of Service (QoS) threshold to the selected server based on the constraining resource. The method includes assigning at least one Virtual Machine (VM) workload, from among compute workloads, to a VM, based on requirements of the VM for resource utilization. The method includes comparing resource utilization of the selected server to the QoS threshold during operation of the assigned VM workloads. The method includes determining whether the selected server fails to satisfy the QoS threshold a pre-defined number of times over a monitoring time interval. In response to determining that the selected server has failed to satisfy the QoS threshold for that pre-defined number of times over the monitoring interval, the method includes migrating at least one of the assigned VM workloads away from the selected server to another server of the IHS.

In accordance with embodiments of the present disclosure, a controller manages software-based virtual resources of an IHS. In one or more embodiments, the controller includes a network interface that communicates with one or more physical servers providing computing functionality of an IHS. The controller includes a memory containing a queue of VM workloads. The controller includes a processor device in communication with the network interface and the memory. The processor device determines, based on a monitored resource utilization, a constraining resource of a selected server that is performing one of storage services and network services from among the one or more physical servers of the IHS. The constraining resource is a resource from among available resources including but not limited to (i) processor capacity, (ii) memory capacity, (iii) network bandwidth, and (iv) storage input/output latency. The processor device assigns a Quality of Service (QoS) threshold to the selected server based on the constraining resource. The processor device assigns at least one VM workload, from among compute workloads, to a VM, based on requirements of the VM for resource utilization. The processor device compares resource utilization of the selected server to the QoS threshold during operation of the assigned VM workloads. The processor device determines whether the selected server fails to satisfy the QoS threshold a pre-defined number of times over a monitoring time interval. In response to determining that selected server has failed to satisfy the QoS threshold for at least that pre-defined number of times over the monitoring interval, the processor device migrates at least one of the assigned VM workloads away from the selected server to another server of the IHS.

According to illustrative embodiments of the present disclosure, an IHS includes one or more physical servers, a network interface that communicates with the one or more physical servers, and a memory containing a queue of one or more VM workloads. A processor device is in communication with the network interface and the memory. The processor device determines, based on a monitored resource utilization, a constraining resource of a selected server that is performing one of storage services and network services from among the one or more physical servers of the IHS. The constraining resource is a resource from among available resources including (i) a processor capacity, (ii) memory capacity, (iii) network bandwidth, and (iv) storage input/output latency. The processor device assigns a QoS threshold to the selected server based on the constraining resource. The processor device assigns at least one VM workload, from among compute workloads, to a VM, based on requirements of the VM for resource utilization. The processor device compares resource utilization of the selected server to the QoS threshold during operation of the assigned VM workloads. The processor device determines whether the selected server fails to satisfy the QoS threshold a pre-defined number of times over a monitoring time interval. In response to determining that selected server has failed to satisfy the QoS threshold for that pre-defined number of times over the monitoring interval, the processor device migrates at least one of the assigned VM workloads away from the selected server to another server of the IHS.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
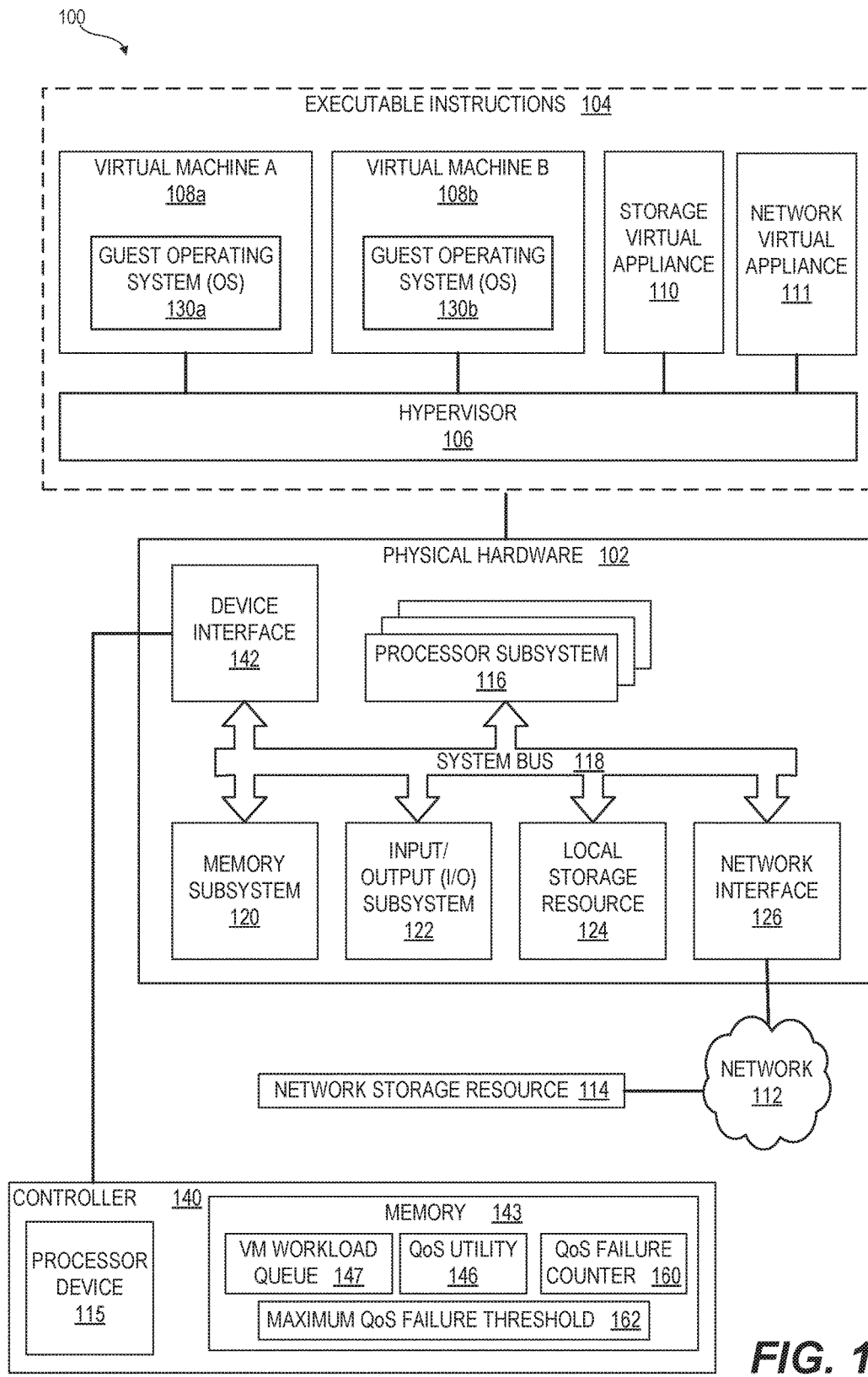
FIG. 1 illustrates a block diagram representation of an example information handling system (IHS) having network and storage services provided using software-based virtualization, according to one or more embodiments.

The disclosure provides a method, controller and Information Handling System (IHS) that provide software-based data center (SBDC) with Quality of Service (QoS) based allocation of Virtual Machine (VM) workloads. In one or more embodiments, compute workloads are assigned to and migrated away from hosts in order to maintain a QoS threshold even with commodity network servers or devices. A processor device in communication with a network interface and a memory containing a queue of one or more VM workloads. The processor device determines, based on monitored resource utilization, a constraining resource of a selected server that is performing one of storage services and network services and assigns a Quality of Service (QoS) threshold to the selected server based on the constraining resource. The processor device assigns VM workload/s, from among compute workloads, to a VM of the IHS based on requirements of the VM for resource utilization. In response to determining that selected server has failed to satisfy the QoS threshold for the predefined number of times over the monitoring interval, the processor device migrates at least one of the assigned VM workloads away from the selected server to another server of the IHS.

Software-based data center (SBDC) is the logical next step from the current hyperconverged/software-defined data center (SDDC) paradigm. Specialization via software can and should replace custom hardware for most data center applications. This SBDC approach is how this specialization via software can be operationalized with the maximum efficiency by running the maximum number of virtual machines across the environment. None of the generally-known technologies has any expectation that the storage devices and the network devices will also be used for standard compute workloads, and therefore, none of these technologies contains the novelty that is disclosed in this innovation. In one or more embodiments, the present disclosure provides for a classic software-based environment with network services being provided by a commodity server. The present disclosure thus enables software-based data centers, software-based data center optimization, and software-based data center commodity server. A system and method of the present disclosure allow storage devices and network devices in an SBDC environment to run compute workloads, while meeting the QoS requirements of the device, based on its primary role as a network device or storage device. SBDC enables deployment and maintenance of an environment that delivers high-quality networking capabilities (based on defined levels of service) while at the same time maximizing the density of virtual machine workloads in that environment.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100. In at least one embodiment, IHS 100 can have a relatively large architectural scale of an enterprise IHS of multiple standalone modular distribution centers (MDCs) and MDCs arranged in a high availability (HA) arrangement as a large-scale information handling system (LIHS). In one or more embodiments, IHS 100 can be a standalone MDC, one or more rack-mounted IHS s, or simply an IHS. Within the general context of IHS s, an IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The IHS may include memory, one or more processing resources such as a central processing unit (CPU) or hardware or software control logic. Additional components or the IHS may include one or more storage devices, one or more communications ports for communicating with external devices as well as various input and output (I/O) devices, such as a keyboard, a mouse, and a video display. The IHS may also include one or more buses operable to transmit communication between the various hardware components. It is appreciated that the IHS described within the present disclosure is a LIHS, with servers acting as the individual processing units.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

Often, virtualized architectures may be employed for numerous reasons, such as, but not limited to: (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows® operating systems), a directory service, a graphical user interface, a networking stack, device drivers, and device management software. In some instances, services may be provided by other application software running on the information handling system, such as a database server.

The information handling system may include multiple processors connected to various devices, such as Peripheral Component Interconnect ("PCI") devices and PCI express ("PCI-e") devices. The operating system may include one or more drivers configured to facilitate the use of the devices. As mentioned previously, the information handling system may also run one or more virtual machines, each of which may instantiate a guest operating system. Virtual machines may be managed by a virtual machine manager, such as, for example, a hypervisor. Certain virtual machines may be configured for device pass-through, such that the virtual machine may utilize a physical device directly without requiring the intermediate use of operating system drivers.

Current virtual information handling systems may demand higher performance from computing resources, such as storage resources used by applications executing under guest operating systems. Many virtualized server platforms may desire to provide storage resources to such applications in the form of software executing on the same server where the applications are executing, which may offer certain advantages by bringing data closest to the application. Such software-defined storage may further enable new technologies, such as, but not limited to: (1) flash caches and cache networks using solid state devices (SSD) to cache storage operations and data; (2) virtual storage area networks (SAN); and (3) data tiering by storing data across local storage resources, SAN storage, and network storage, depending on I/O load and access patterns. Server virtualization has been a key enabler of software-defined storage by enabling multiple workloads to run on a single physical machine. Such workloads also benefit by provisioning storage resources closest to the application accessing data stored on the storage resources.

Additionally, the information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

IHS 100 includes physical hardware 102, executable instructions 104 that include hypervisor 106, one or more virtual machines 108a-108b, and storage virtual appliance 110. IHS 100 includes external or remote elements, namely, network 112 and network storage resource 114 that can be used as a storage virtual appliance 110. In one or more embodiments, components of physical hardware 102 may include, but are not limited to, processor subsystem 116, which may comprise one or more processors, and system bus 118. System bus 118 communicatively couples various system components to processor subsystem 116 including, for example, memory subsystem 120, I/O subsystem 122, local storage resource 124, and network interface 126. System bus 118 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 126 is a suitable system, apparatus, or device operable to serve as an interface between IHS 100 and a network 112. Network interface 126 enables IHS 100 to communicate over network 112 using one or more suitable transmission protocols or standards, including, but not limited to, transmission protocols or standards enumerated below with respect to the discussion of network 112. In some embodiments, network interface 126 may be communicatively coupled via network 112 to network storage resource 114. Network 112 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, or another appropriate architecture or system that facilitates the communication of signals, data or messages (generally referred to as data). Network 112 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 112 and its various components may be implemented using hardware, software, or any combination thereof.

Processor device 115 and processor subsystem 116 comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor device 115 and processor subsystem 116 may interpret and execute program instructions or process data stored locally, for example in memory subsystem 120 or another component of physical hardware 102. In the same or alternative embodiments, processor device 115 and processor subsystem 116 may interpret and execute program instructions or process data stored remotely, such as in network storage resource 114. In particular, processor device 115 and processor subsystem 116 may either represent a multi-processor configuration that includes at least a first processor and a second processor.

Memory subsystem 120 comprises a system, device, or apparatus (e.g., computer-readable media) operable to retain and retrieve program instructions and data for a period of time. Memory subsystem 120 may comprise random access memory (RAM), electrically erasable programmable read-only memory (EEPROM), a PCMCIA card, flash memory, magnetic storage, opto-magnetic storage, or a suitable selection or array of volatile or non-volatile memory that retains data after power to an associated information handling system, such as IHS 100, is powered down. Local storage resource 124 comprises computer-readable media (e.g., hard disk drive, floppy disk drive, CD-ROM, and/or other type of rotating storage media, flash memory, EEPROM, and/or another type of solid state storage media) and is generally operable to store instructions and data. Likewise, network storage resource 114 comprises computer-readable media (e.g., hard disk drive, floppy disk drive, CD-ROM, or other type of rotating storage media, flash memory, EEPROM, or other type of solid state storage media) and may be generally operable to store instructions and data. In IHS 100, I/O subsystem 122 comprises a system, device, or apparatus generally operable to receive and transmit data to or from or within IHS 100. I/O subsystem 122 may represent, for example, any one or more of a variety of communication interfaces, graphics interfaces, video interfaces, user input interfaces, and peripheral interfaces.

Hypervisor 106 comprises software (i.e., executable code or instructions) and firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 106 may be one of a variety of proprietary and/or commercially available virtualization platforms.

Virtual machine 1 108*a* represents a host for guest OS 130*a*, while virtual machine 2 108*b* represents a host for guest OS 130*b*. To allow multiple operating systems to be executed on IHS 100 at the same time, hypervisor 106 may virtualize certain hardware resources of physical hardware 102 and present virtualized computer hardware representations to each virtual machine 108. In other words, hypervisor 106 may assign to each of virtual machines 108, for example, one or more processors or processor bandwidth from processor subsystem 116, one or more regions of memory in memory subsystem 120, and one or more components of I/O subsystem 122, etc. The virtualized hardware representation presented to each of virtual machines 108 may comprise a mutually exclusive set of hardware resources per virtual machine 108. For example, the virtual machines 108 may be disjoint or nonoverlapping with no hardware resources that are shared between virtual machines 108. In other embodiments, the virtualized hardware representation may comprise an overlapping set of hardware resources per virtual machine 108, with one or more hardware resources that are shared by two or more virtual machines 108.

In FIG. 1, each of virtual machines 108 may respectively include an instance of guest operating system (guest OS) 130, along with any applications or other software running on guest OS 130. Each guest OS 130 may represent an OS compatible with and supported by hypervisor 106, even when guest OS 130 is incompatible to a certain extent with physical hardware 102, which is virtualized by hypervisor 106. In addition, each guest OS 130 may be a separate instance of the same operating system or an instance of a different operating system. Although IHS 100 is depicted as having two virtual machines 108*a*, 108*b*, and storage virtual appliance 110, it will be understood that, in particular embodiments, different numbers of virtual machines 108 may be executing on information handling IHS 100 at any given time.

In FIG. 1, storage virtual appliance 110 may represent storage software executing on hypervisor 106. Network virtual appliance 111 may represent network software executing on hypervisor 106. Although storage virtual appliance 110 and network virtual appliance 111 may be each implemented as a virtual machine, and may execute in a similar environment and address space as described above with respect to virtual machines 108, storage virtual appliance 110 may be dedicated to providing access to storage resources to instances of guest OS 130. Similarly, network virtual appliance 111 may be dedicated to providing access to network resources to instances of guest OS 130. Thus storage virtual appliance 110 may not itself be a host for a guest OS that is provided as a resource to users, but may be an embedded feature of information handling IHS 100. It will be understood, however, that storage virtual appliance 110 may include an embedded virtualized OS (not shown) similar to various implementations of guest OS 130 described previously herein. In particular, storage virtual appliance 110 may enjoy pass-through device access to various devices and interfaces for accessing storage resources (local and/or remote) and may be enabled to provide logical communication connections between desired storage resources and guest OS 130 using direct memory access for very high data throughput rates and very low latency transfer operations, as described herein.

In operation of IHS 100 shown in FIG. 1, hypervisor 106 of information handling IHS 100 may virtualize the hardware resources of physical hardware 102 and present virtualized computer hardware representations to each of virtual machines 108. Each guest OS 130 of virtual machines 108 may then begin to operate and run applications and/or other software. While operating, each guest OS 130 may utilize one or more hardware resources of physical hardware 102 assigned to the respective virtual machine by hypervisor 106. Each guest OS 130 and/or application executing under guest OS 130 may be presented with storage resources that are managed by storage virtual appliance 110 and by network resources that are managed by network virtual appliance 111. In other words, storage virtual appliance 110 may be enabled to mount and partition various combinations of physical storage resources, including local storage resources and remote storage resources, and present these physical storage resources as desired logical storage devices for access by guest OS 130. The hypervisor 106 can communicate with network devices either locally over system bus 118 or over network 112.

A controller 140 can be part of hypervisor 106 or can communicate via a device interface 142 to the system bus 118 to the hypervisor 106. For clarity, FIG. 1 illustrates the controller 140 as a discrete computing device having a memory 143 containing a QoS utility 144. On a processor device 115, controller 140 executes a QoS utility, which performs QoS based allocation of VM workloads referenced in a VM workload queue 147 on the commodity network servers 132, 134. The processor device 115 thereby manages software-based virtual resources of the IHS 100. In one or more embodiments, the processor device 115 determines based on a monitored resource utilization, a constraining resource of a selected server 132, 134 that is performing one of storage services and network services from among the one or more physical servers 132, 134 of the IHS 100. The constraining resource is a resource from among available resources, including (i) processor capacity, (ii) memory capacity, (iii) network bandwidth, and (iv) storage input/output latency. The processor device 115 assigns a QoS threshold to the selected server 132, 134 based on the constraining resource. The processor device 115 assigns at least one VM workload, from among compute workloads, to a VM, based on requirements of the VM for resource utilization. The processor device 115 compares resource utilization of the selected server to the QoS threshold during operation of the assigned VM workloads. The processor device 115 determines whether the selected server fails to satisfy the QoS threshold a pre-defined number of times over a monitoring time interval. In an exemplary embodiment, the processor device 115 increments a QoS failure counter 160 when a failure interrupt is detected. The processor device 115 can compare a current value in the QoS failure counter 160 against a pre-defined value in a maximum QoS failure threshold register 162. In response to determining that selected server has failed to satisfy the QoS threshold (i.e., failure for the number of times recorded), the processor device 115 migrates at least one of the assigned VM workloads away from the selected server to another server of the IHS.

FIGS. 2-7 illustrates methods 200-700 by which a processor device 116 (FIG. 1) performs different aspects of the processes that enable the one or more embodiments of the disclosure. Generally, methods 200-700 represent a computer-implemented method. The description of methods 200-700 is provided with general reference to the specific components illustrated within the preceding FIG. 1. Generally methods 200-700 is described as being implemented via processor device 116 (FIG. 1) and particularly the execution of code provided by QoS utility 142 (FIG. 1) within processor device 115 (FIG. 1). The execution of this QoS utility 142 (FIG. 1) results in the implementation of efficient allocation of VM workloads according to QoS of network devices. It is however appreciated that certain aspects of the described methods may be implemented via other processing devices and/or execution of other code.

Figure 2:
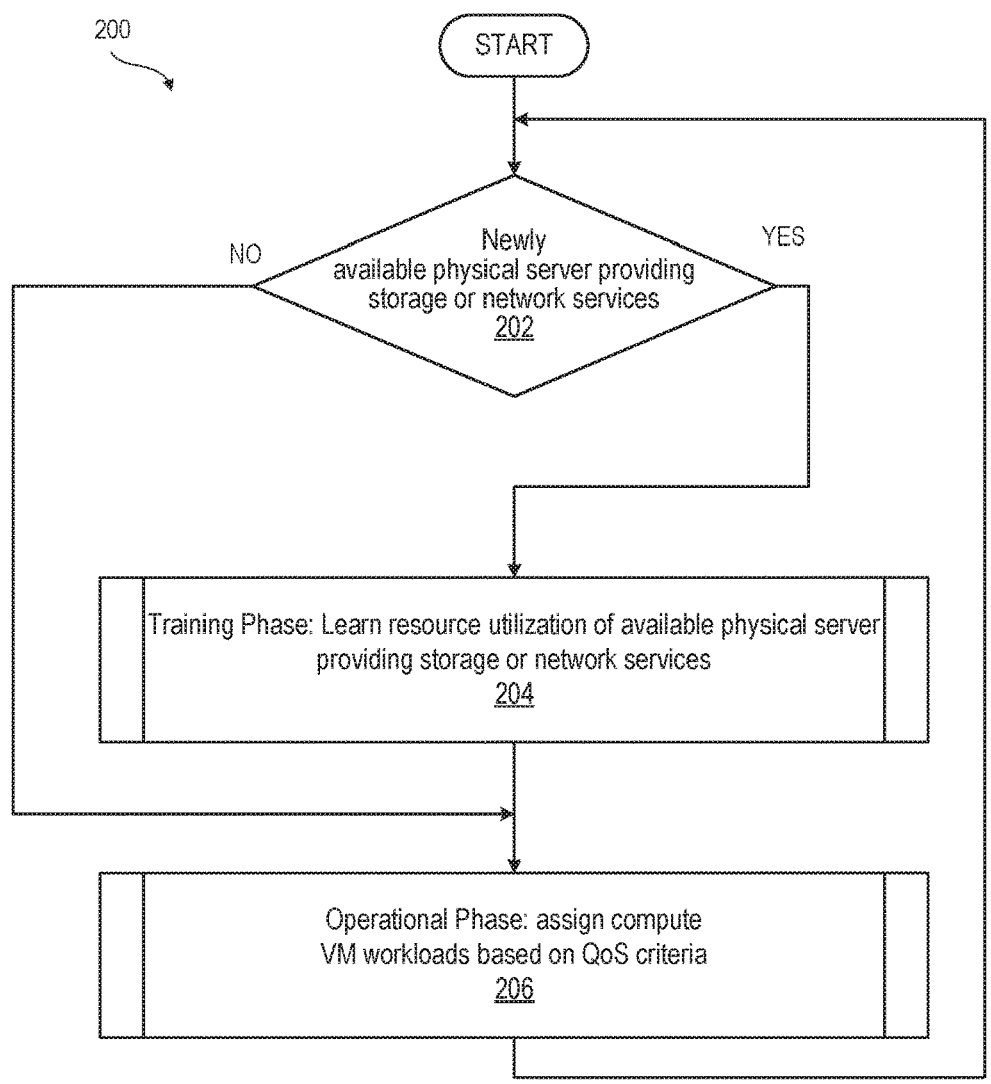
FIG. 2 illustrates a high-level method performed by a controller of the IHS of FIG. 1 in managing VM workloads, according to one or more embodiments.

FIG. 2 illustrates a high-level method 200 performed by the processor device 115 (FIG. 1) in managing VM workloads. The controller of an IHS determines whether there is a newly available physical server providing storage or network services that can be utilized to host compute workloads (decision block 202). In response to determining that there is a newly available physical server providing storage or network services that can be utilized in decision block 202, the method 200 includes the controller entering a training phase by learning resource utilization of the newly available network storage/s and/or network compute devices (block 204). Then, the method 200 includes the controller entering an operational phase by assigning compute VM workloads based on QoS criteria (block 206). Then method 200 returns to decision block 202 to continue monitoring and assigning. In response to determining in decision block 202 that there is not a newly available physical server providing storage or network services that can be utilized, the method 200 proceeds to block 206 to perform the operational phase.

Figure 3:
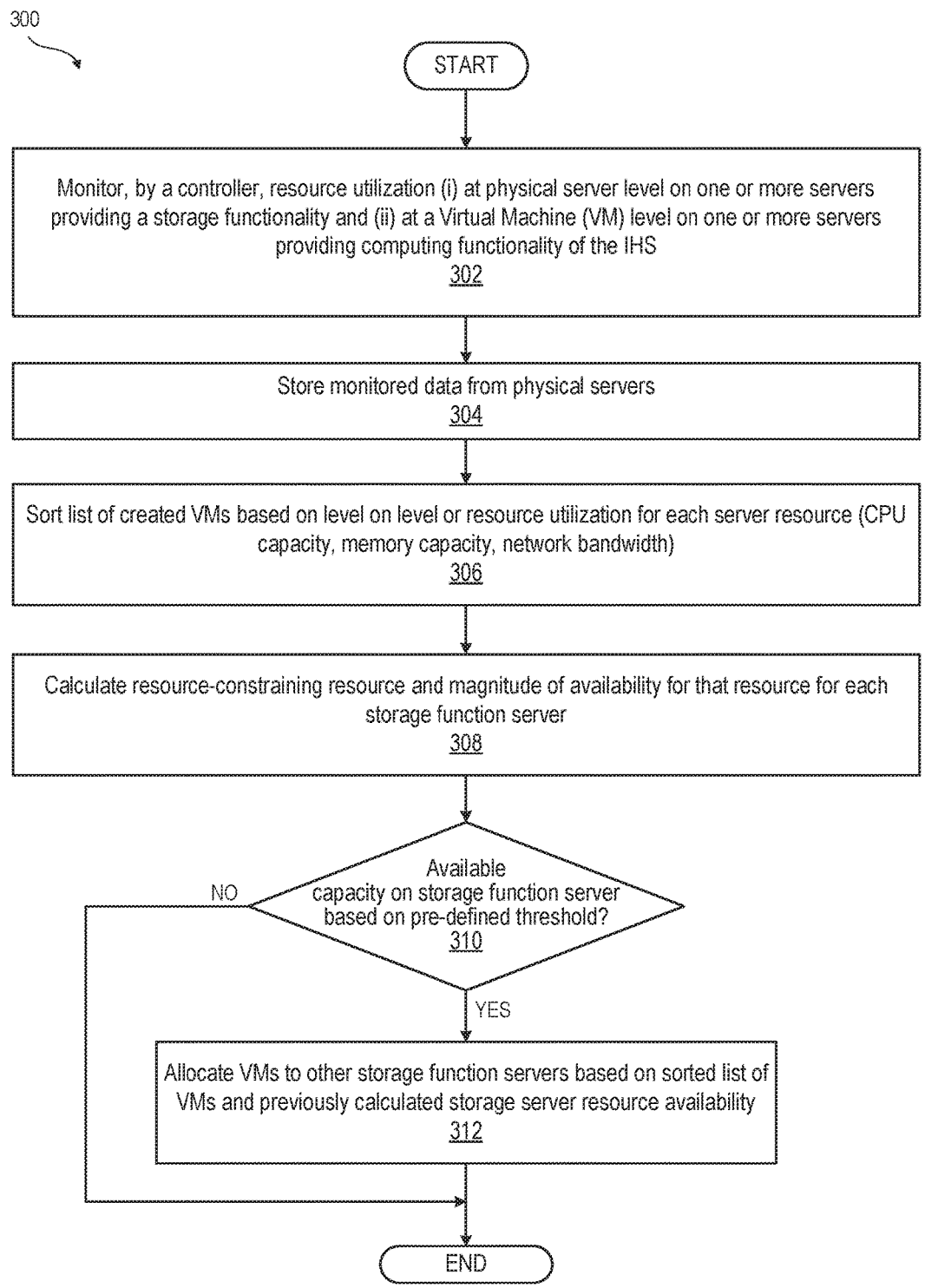
FIG. 3 illustrates a flow diagram of a method of performing a training phase for utilizing compute devices as storage devices, according to one or more embodiments.

FIG. 3 illustrates a method 300 of performing the training phase for utilizing network devices as storage devices. The method 300 includes monitoring, by a controller, resource utilization (i) at physical server level on one or more physical servers providing a selected one of a storage functionality and (ii) at a Virtual Machine (VM) level on one or more physical servers providing computing functionality of the IHS (block 302). Method 300 includes storing monitored data from physical servers (block 304). Method 300 includes sorting list of created VMs based on level of resource utilization for each server resource (CPU capacity, memory capacity, and network bandwidth) (block 306). Method 300 includes calculating resource-constraining resource and magnitude of availability for that resource for each storage function server, such as a network server that serves as a network storage resource (block 308). Method 300 includes determining whether capacity is available on storage function server based on pre-defined threshold (decision block 310). In response to determining in decision block 310 that capacity is available on storage function server based on the pre-defined threshold, method 300 includes allocating VMs to storage function servers based on sorted list of VMs and previously calculated storage server resource availability (block 312). Then method 300 ends. In response to determining in decision block 310 that capacity is not available on storage function server based on the pre-defined threshold, method 300 includes allocating VMs to storage function servers based on a sorted list of VMs and previously calculated storage server resource availability (block 312). Then method 300 ends.

Figure 4:
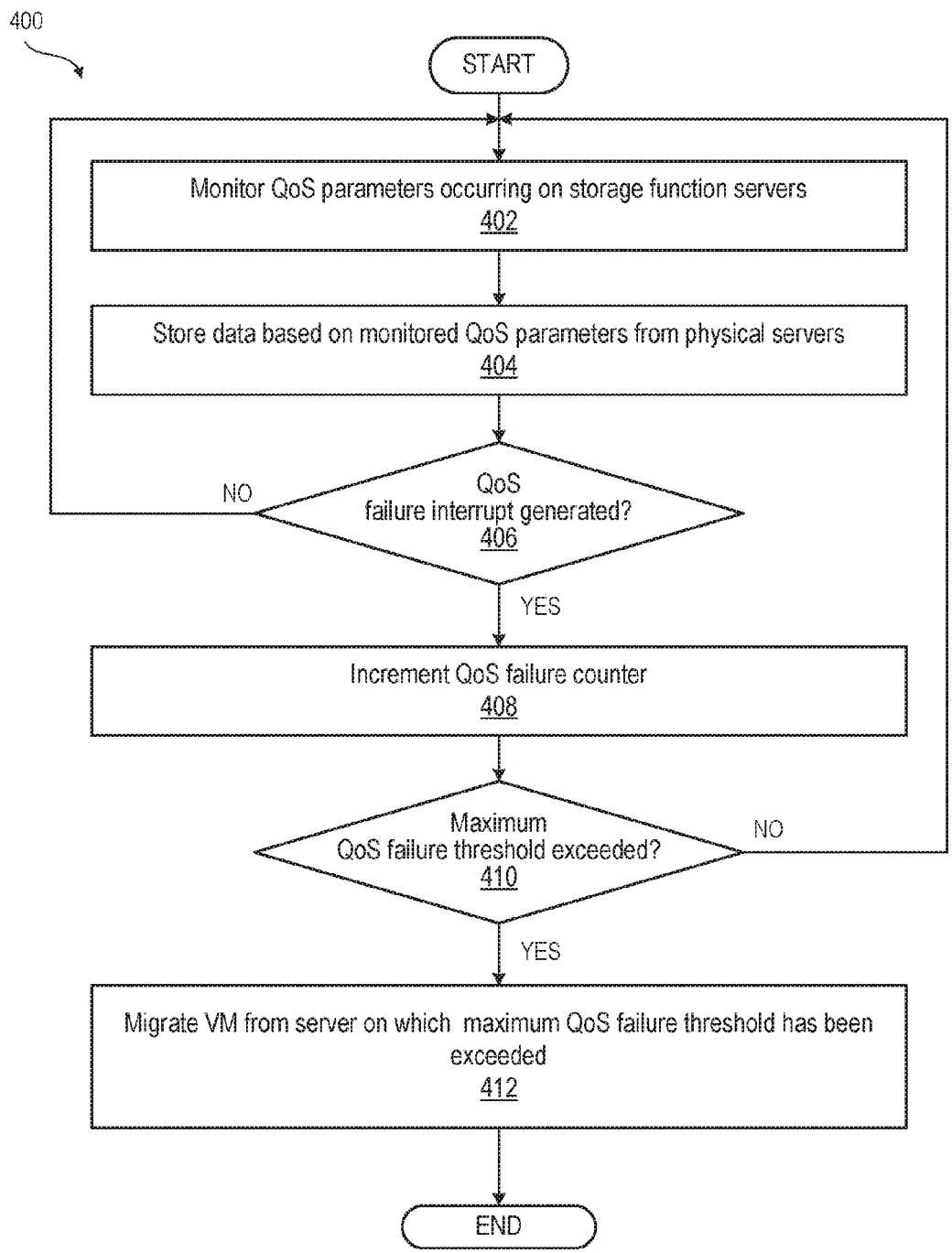
FIG. 4 illustrates a flow diagram of a method of performing an operational phase for utilizing compute devices as storage devices, according to one or more embodiments.

FIG. 4 illustrates a method 400 of performing the operational phase for utilizing network devices as storage devices. In one or more embodiments, method 400 includes monitoring QoS parameters occurring on storage function servers (block 402). Method 400 includes storing data based on monitored QoS parameters from physical servers (block 404). Method 400 includes determining (at decision block 406) whether QoS failure interrupt is generated. In response to determining that QoS failure interrupt is not generated in decision block 406, method 400 includes returning to block 402 to continue the operational phase. In response to determining that QoS failure interrupt is generated in decision block 406, method 400 includes incrementing QoS failure counter (block 408). Method 400 includes determining whether maximum QoS failure threshold is exceeded (decision block 410). In response to determining that maximum QoS failure threshold is exceeded in decision block 410, method 400 includes migrating VM from server on which maximum QoS failure threshold has been exceeded (block 412). Then method 400 ends. In response to determining that maximum QoS failure threshold is not exceeded in decision block 410, method 400 ends.

Figure 5:
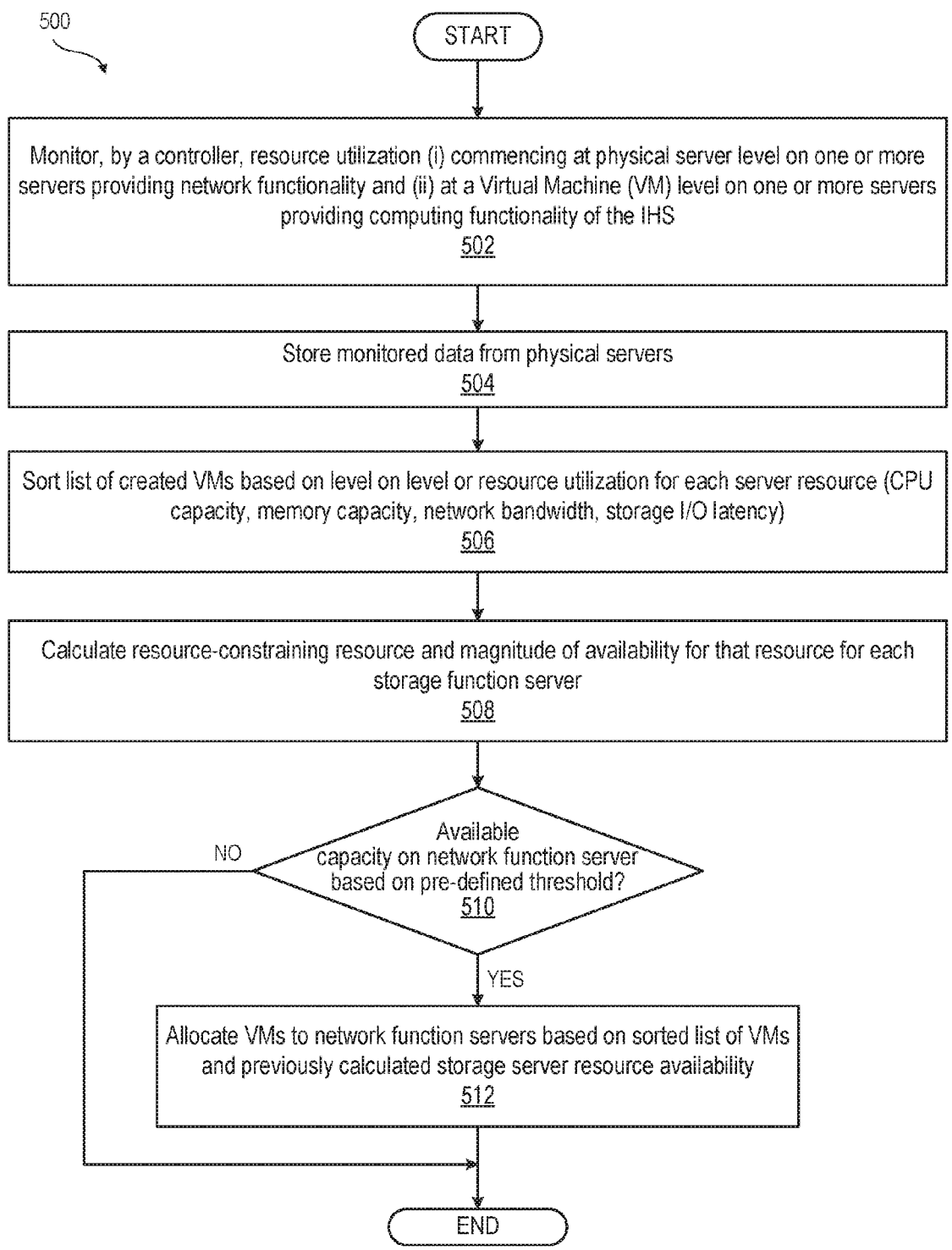
FIG. 5 illustrates a flow diagram of a method of performing a training phase for utilizing compute devices as network devices, according to one or more embodiments.

FIG. 5 illustrates a method 500 of the performing the training phase for utilizing compute devices as network devices. In one or more embodiments, method 500 includes monitoring, by a controller, resource utilization (i) commencing at physical server level on one or more physical servers providing network functionality and (ii) at a Virtual Machine (VM) level on one or more physical servers providing computing functionality of the IHS (block 502). Method 500 includes storing monitored data from physical servers (block 504). Method 500 includes sorting list of created VMs based on level or resource utilization for each server resource (CPU capacity, memory capacity, network bandwidth, storage I/O latency) (block 506). Method 500 includes calculating resource-constraining resource and magnitude of availability for that resource for each storage function server (block 508). Method 500 includes determining whether capacity is available on network function server based on a pre-defined threshold (decision block 510). In response to determining in decision block 510 that capacity is not available on network function server based on the pre-defined threshold, the method 500 ends. In response to determining in decision block 510 that capacity is available on network function server based on pre-defined threshold, then method 500 includes allocating VMs to other network function servers based on sorted list of VMs and previously calculated storage server resource availability (block 512). Then method 500 ends.

Figure 6:
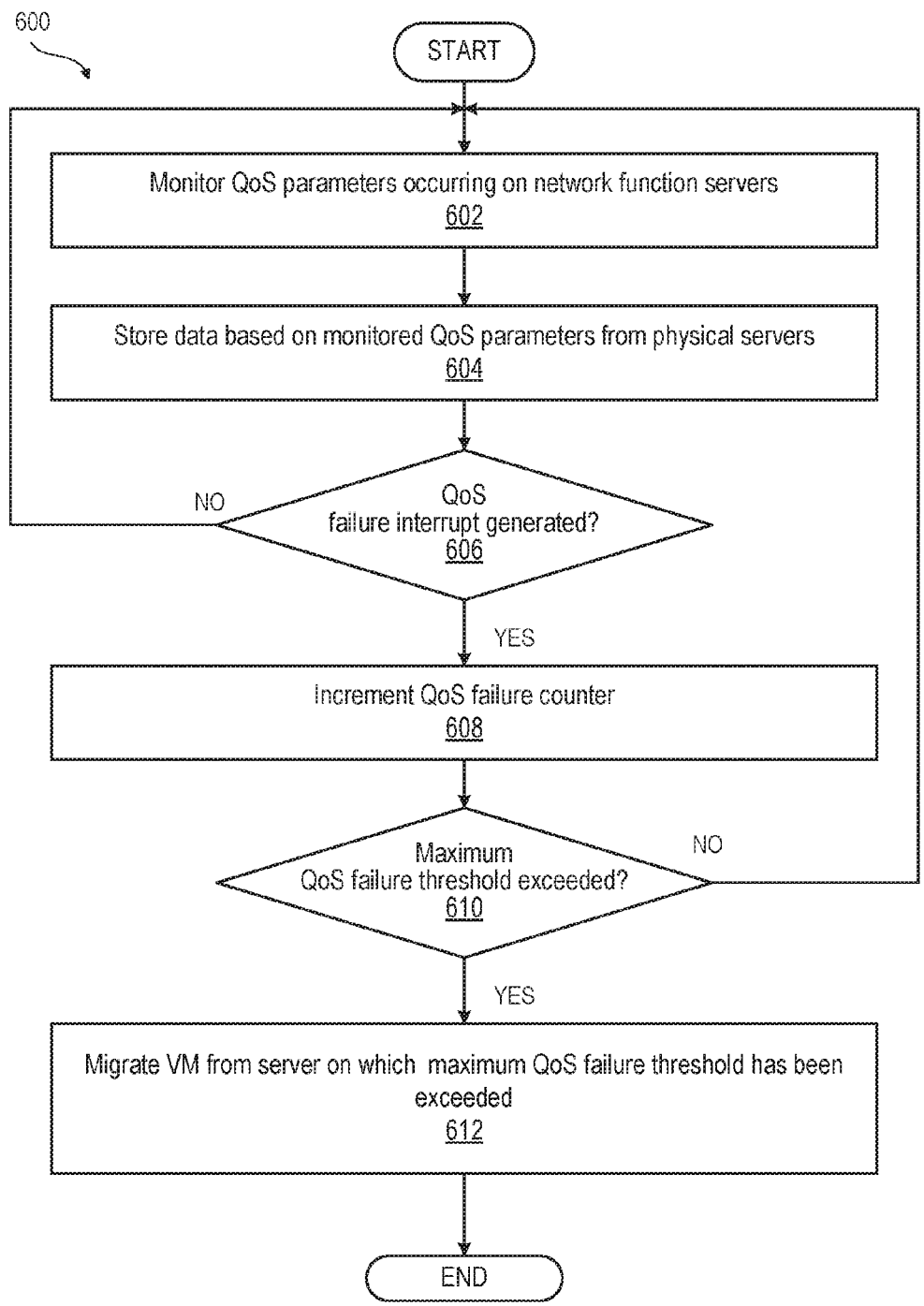
FIG. 6 illustrates a flow diagram of a method of performing an operational phase for utilizing compute devices as network devices, according to one or more embodiments.

FIG. 6 illustrates a method 600 of performing the operational phase for utilizing network devices as compute devices. In one or more embodiments, method 600 includes monitoring QoS parameters occurring on network function servers (block 602). Method 600 includes storing data based on monitored QoS parameters from physical servers (block 604). Method 600 includes determining whether a QoS failure interrupt is generated (decision block 606). In response to determining that a QoS failure interrupt is not generated in decision block 606, method 600 returns to block 602 to continue monitoring in the operational phase. In response to determining that a QoS failure interrupt is generated in decision block 606, method 600 includes incrementing QoS failure counter (block 608). Method 600 includes determining (at decision block 610) whether maximum QoS failure threshold is exceeded. In response to determining that maximum QoS failure threshold is not exceeded in decision block 610, method 600 includes returning to block 602 to continue monitoring in the operational phase. In response to determining that maximum QoS failure threshold is exceeded in decision block 610, method 600 includes migrating VM from server on which maximum QoS failure threshold has been exceeded (block 612). Then method 600 ends.

Figure 7:
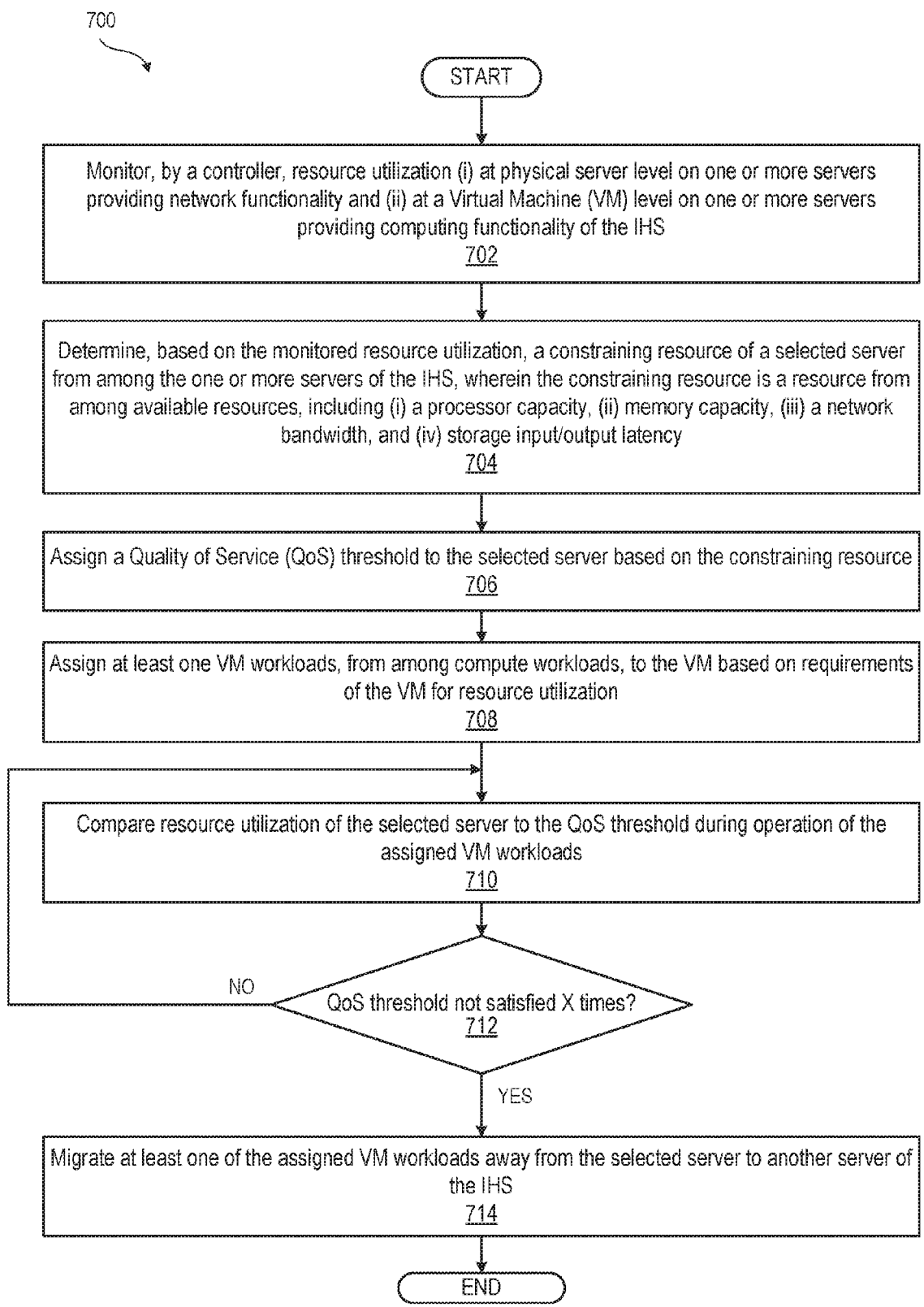
FIG. 7 illustrates a flow diagram of managing software-based virtual resources of an IHS, according to one or more embodiments.

FIG. 7 illustrates a method 700 of managing software-based virtual resources of an IHS. In one or more embodiments, method 700 includes monitoring, by the controller, resource utilization at (i) a physical server level on one or more physical servers providing a selected one of storage and network functionality and (ii) a VM level on one or more physical servers providing computing functionality of the IHS (block 702). Method 700 includes determining, by the controller, based on the monitored resource utilization, a constraining resource of a selected server that is performing one of storage services and network services from among the one or more physical servers of the IHS. The constraining resource is a resource from among available resources, including (i) processor capacity, (ii) memory capacity, (iii) network bandwidth, and (iv) storage input/output latency (block 704). Method 700 includes assigning a QoS threshold to the selected server based on the constraining resource (block 706). Method 700 includes assigning at least one VM workload, from among compute workloads, to a VM, based on requirements of the VM for resource utilization (block 708). Method 700 includes comparing resource utilization of the selected server to the QoS threshold during operation of the assigned VM workloads (block 710). Method 700 includes determining whether the selected server fails to satisfy the QoS threshold a pre-defined number of times over a monitoring time interval (decision block 712). In response to determining in decision block 712 that the selected server has not failed to satisfy the QoS threshold the pre-defined number of times over the monitoring time interval, method 700 returns to block 710 to continue comparing the resource utilization to the QoS threshold. In response to determining in decision block 712 that the selected server has failed to satisfy the QoS threshold the pre-defined number of times over the monitoring time interval, method 700 includes migrating at least one of the assigned VM workloads away from the selected server to another server of the IHS (block 714). Then method 700 ends.

In one or more embodiments, method 700 includes comparing resource utilization of the selected server to the QoS threshold during operation of the assigned VM workloads by (i) determining whether a QoS failure interrupt is generated; and (ii) in response to determining whether the QoS failure interrupt is generated, incrementing a QoS failure counter.

In one or more embodiments, method 700 includes monitoring resource utilization by monitoring, at a physical server level, the one or more physical servers providing the selected one of a storage and network functionality. In these embodiments, the constraining resource is one or both of storage input/output latency at a pre-defined range of block size and input/output operations per second (IOPS) levels.

In one or more embodiments, method 700 includes monitoring resource utilization by monitoring, at the VM level, the one or more physical servers providing computing functionality of the IHS. In these embodiments, the constraining resource is network bandwidth based upon at least one of intra-switch latency and switch port queue depth.

In one or more embodiments, method 700 includes migrating the at least one of the assigned VM workloads away from the selected server to another server of the IHS by: (i) determining a respective resource utilization of each assigned VM workloads on the selected server; and (ii) migrating a selected VM workload having a highest resource utilization of the assigned VM workloads to the other server device of the IHS.

In the above described flow chart of FIGS. 2-7, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of managing software-based virtual resources of an Information Handling System (IHS), the method comprising:
    monitoring resource utilization by the one or more physical servers at a physical server level and at a VM level;
    determining, by a controller of the IHS, based on the monitored resource utilization, a constraining resource of a selected server that is performing one of storage services and network services from among the one or more physical servers of the HIS, wherein, at the physical server level, the constraining resource comprises storage input/output latency at a pre-defined range of block size and input/output operations per second (IOPS) levels and, at the VM level, the constraining resource comprises network bandwidth based upon at least one of intra-switch latency and switch port queue depth;
    assigning a Quality of Service (QoS) threshold to the selected server based on the constraining resource;
    assigning at least one Virtual Machine (VM) workload, from among compute workloads, to a VM, based on requirements of the VM for resource utilization;
    comparing resource utilization of the selected server to the QoS threshold during operation of the assigned VM workloads;
    determining whether the selected server fails to satisfy the QoS threshold a pre-defined number of times over a monitoring time interval; and
    in response to determining that the selected server has failed to satisfy the QoS threshold the predefined number of times over the monitoring interval, migrating at least one of the assigned VM workloads away from the selected server to another server of the IHS.

2. The method of claim 1, further comprising monitoring, by the controller, resource utilization at (i) a physical server level on one or more physical servers providing a selected one of storage and network functionality and (ii) a VM level on one or more physical servers providing computing functionality of the IHS.

3. The method of claim 1, wherein comparing resource utilization of the selected server to the QoS threshold during operation of the assigned VM workloads comprises:
    determining whether a QoS failure interrupt is generated; and
    in response to determining whether the QoS failure interrupt is generated, incrementing a QoS failure counter.

4. The method of claim 1, wherein migrating the at least one of the assigned VM workloads away from the selected server to another server of the IHS comprises:
    determining a respective resource utilization of each assigned VM workloads on the selected server; and
    migrating a selected VM workload having a highest resource utilization of the assigned VM workloads to the other server device of the IHS.

5. A controller that manages software-based virtual resources of an Information Handling System (IHS), the controller comprising:
    a network interface that communicates with one or more physical servers providing computing functionality of an IHS;
    a memory containing a queue of virtual machine (VM) workloads; and
    a processor device in communication with the network interface and the memory, wherein the processor device:
        monitors resource utilization by the one or more physical servers at a physical server level and at a VM level;
        determines, based on the monitored resource utilization, a constraining resource of a selected server that is performing one of storage services and network services from among the one or more physical servers of the HIS, wherein, at the physical server level, the constraining resource comprises storage input/output latency at a pre-defined range of block size and input/output operations per second (TOPS) levels and, at the VM level, the constraining resource comprises network bandwidth based upon at least one of intra-switch latency and switch port queue depth;
        assigns a Quality of Service (QoS) threshold to the selected server based on the constraining resource;
        assigns at least one VM workload, from among compute workloads, to a VM, based on requirements of the VM for resource utilization;
        compares resource utilization of the selected server to the QoS threshold during operation of the assigned VM workloads;
        determines whether the selected server fails to satisfy the QoS threshold a pre-defined number of times over a monitoring time interval; and
        in response to determining that the selected server has failed to satisfy the QoS threshold the predefined number of times over the monitoring interval, migrates at least one of the assigned VM workloads away from the selected server to another server of the IHS.

6. The controller of claim 5, wherein the processor device monitors resource utilization (i) at physical server level on one or more physical servers providing a selected one of a storage and network functionality and (ii) at a Virtual Machine (VM) level on one or more physical servers providing computing functionality of the IHS.

7. The controller of claim 5, wherein the processor device compares resource utilization of the selected server to the QoS threshold during operation of the assigned VM workloads by:
    determining whether a QoS failure interrupt is generated; and
    in response to determining whether the QoS failure interrupt is generated, incrementing a QoS failure counter.

8. The controller of claim 5, wherein the processor device migrates the at least one of the assigned VM workloads away from the selected server to another server of the IHS by:
    determining a respective resource utilization of each assigned VM workloads on the selected server; and migrating a selected VM workload having a highest resource utilization of the assigned VM workloads to the other server device of the IHS.

9. An Information Handling System (IHS) comprising:
one or more physical servers;
a network interface that communicates with the one or more physical servers;
a memory containing a queue of one or more virtual machine (VM) workloads; and
a processor device in communication with the network interface and the memory, wherein the processor device:
   monitors resource utilization by the one or more physical servers at a physical server level and at a VM level;
   determines, based on the monitored resource utilization, a constraining resource of a selected server that is performing one of storage services and network services from among the one or more physical servers of the IHS, wherein, at the physical server level, the constraining resource comprises storage input/output latency at a pre-defined range of block size and input/output operations per second (TOPS) levels and, at the VM level, the constraining resource comprises network bandwidth based upon at least one of intra-switch latency and switch port queue depth;
   assigns a Quality of Service (QoS) threshold to the selected server based on the constraining resource;
   assigns at least one VM workload, from among compute workloads, to a VM, based on requirements of the VM for resource utilization;
   compares resource utilization of the selected server to the QoS threshold during operation of the assigned VM workloads;
   determines whether the selected server fails to satisfy the QoS threshold a pre-defined number of times over a monitoring time interval; and
   in response to determining that the selected server has failed to satisfy the QoS threshold the predefined number of times over the monitoring interval, migrates at least one of the assigned VM workloads away from the selected server to another server of the IHS.

10. The IHS of claim 9, wherein the processor device monitors resource utilization (i) at physical server level on one or more physical servers providing a selected one of a storage and network functionality and (ii) at a Virtual Machine (VM) level on one or more physical servers providing computing functionality of the IHS.

11. The IHS of claim 9, wherein the processor device compares resource utilization of the selected server to the QoS threshold during operation of the assigned VM workloads by:
   determining whether a QoS failure interrupt is generated; and
   in response to determining whether the QoS failure interrupt is generated, incrementing a QoS failure counter.

12. The IHS of claim 9, wherein the processor device migrates the at least one of the assigned VM workloads away from the selected server to another server of the IHS by:
   determining a respective resource utilization of each assigned VM workloads on the selected server; and
   migrating a selected VM workload having a highest resource utilization of the assigned VM workloads to the other server device of the IHS.

* * * * *

UNITED STATES PATENT AND TRADEMARK OFFICE
CERTIFICATE OF CORRECTION

PATENT NO. : 10,237,201 B2  
APPLICATION NO. : 15/168138  
DATED : March 19, 2019  
INVENTOR(S) : John Kelly Page 1 of 1

It is certified that error appears in the above-identified patent and that said Letters Patent is hereby corrected as shown below:

In the Claims

Column 16, Line 26, Claim 7, after "operations per second" delete "(TOPS}".
Column 16, Line 26, Claim 7, after "operations per second" insert --(IOPS)--.
Column 17, Line 22, Claim 9, after "operations per second" delete "(TOPS}".
Column 17, Line 22, Claim 9, after "operations per second" insert --(IOPS)--.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*